ID#

United States Patent
Manfe et al.

(10) Patent No.: US 9,367,547 B2
(45) Date of Patent: Jun. 14, 2016

(54) METHOD AND SYSTEM FOR GENERATING AND DEPLOYING CONTAINER TEMPLATES

(71) Applicants: Thierry Manfe, Montbonnot Saint Martin (FR); Allan Neil Packer, Adelaide (AU); Michael Leroy Gerdts, Madison, WI (US); Sanjay Gurudatt Nadkarni, Louisville, CO (US); Jesse Butler, Rockland, ME (US)

(72) Inventors: Thierry Manfe, Montbonnot Saint Martin (FR); Allan Neil Packer, Adelaide (AU); Michael Leroy Gerdts, Madison, WI (US); Sanjay Gurudatt Nadkarni, Louisville, CO (US); Jesse Butler, Rockland, ME (US)

(73) Assignee: Oracle International Corporation, Redwood Shores, CA (US)

( * ) Notice: Subject to any disclaimer, the term of this patent is extended or adjusted under 35 U.S.C. 154(b) by 554 days.

(21) Appl. No.: 13/826,291

(22) Filed: Mar. 14, 2013

(65) Prior Publication Data
US 2014/0279908 A1    Sep. 18, 2014

(51) Int. Cl.
G06F 9/45        (2006.01)
G06F 17/30       (2006.01)

(52) U.S. Cl.
CPC .......... *G06F 17/30067* (2013.01); *G06F 17/30* (2013.01)

(58) Field of Classification Search
CPC ............................ G06F 17/30; G06F 17/30067
See application file for complete search history.

(56) References Cited

U.S. PATENT DOCUMENTS

| | | | |
|---|---|---|---|
| 5,778,390 A * | 7/1998 | Nelson | G06F 17/30067 |
| 6,345,361 B1 * | 2/2002 | Jerger et al. | 726/3 |
| 7,526,774 B1 * | 4/2009 | Beck et al. | 719/320 |
| 2001/0052016 A1 * | 12/2001 | Skene | G06F 9/505 709/226 |
| 2003/0163487 A1 * | 8/2003 | Lanzatella | G06F 3/0601 |
| 2004/0024778 A1 * | 2/2004 | Cheo | G06F 17/30613 |
| 2004/0226019 A1 * | 11/2004 | Tucker | G06F 9/468 719/310 |
| 2004/0243997 A1 * | 12/2004 | Mullen et al. | 717/174 |
| 2005/0021788 A1 * | 1/2005 | Tucker et al. | 709/229 |
| 2006/0129558 A1 * | 6/2006 | Brown | G06F 17/30067 |
| 2006/0149714 A1 * | 7/2006 | Fellenstein et al. | 707/3 |
| 2006/0259499 A1 * | 11/2006 | Moulckers et al. | 707/100 |
| 2007/0134069 A1 * | 6/2007 | Smith | G06F 9/5072 406/39 |
| 2007/0136723 A1 * | 6/2007 | Smith | G06F 21/6281 718/1 |
| 2008/0209392 A1 * | 8/2008 | Able et al. | 717/105 |
| 2008/0294703 A1 * | 11/2008 | Craft | G06F 17/30067 |
| 2009/0222462 A1 * | 9/2009 | Alpern | G06F 17/30 |

OTHER PUBLICATIONS

Christoph Schuba et al., "Security Advantages of Solaris™ Zones Software", [Online], 2009, pp. 1-20, [Retrieved from Internet on Aug. 12, 2015], <http://citeseerx.ist.psu.edu/viewdoc/download?doi=10.1.1.185.45&rep=rep1&type=pdf>.*

(Continued)

*Primary Examiner* — Thuy Dao
*Assistant Examiner* — Ziaul A Chowdhury
(74) *Attorney, Agent, or Firm* — Osha Liang LLP

(57) ABSTRACT

A method for creating a deployable zone template of a source zone, involving receiving, from the user an instruction to create the deployable zone template of a source zone including a zonepath dataset (ZPDS) and an application image (AI), where the ZPDS is a hierarchy of file systems in which an operating system image of the source zone is installed, creating a zonepath image file of the ZPDS, creating an application image file of the AI, collecting auxiliary zone data describing a dependency of the source zone and configuration a parameter of the source zone, creating an archive file including the zonepath image file, the application image file, and the auxiliary zone data, and combining the archive file and an executable wrapper script to obtain the deployable zone template.

12 Claims, 6 Drawing Sheets

(56) References Cited

OTHER PUBLICATIONS

Jeff Victor et al., "Solaris Container Technology Architecture Guide" [Online], May 2006, pp. 1-46, [Retrieved from Internet on Feb. 12, 2016], <http://citeseerx.ist.psu.edu/viewdoc/download?doi=10.1.1.119.1587&rep=rep1&type=pdf>.*

Luis Loyola et al.,"Organizational virtual zones: Control of Internet edges using multi-level flat Identifiers", [Online], 2008. pp. 2739-2454, [Retrieved from Internet on Feb. 12, 2016], <http://ac.els-cdn.com/S0140366408001916/1-s2.0-S0140366408001916-main.pdf>.*

Dr. Christoph Schuba et al., "Security Advantage of Solaris Zones Software", [Online], Jan. 2009, 22 pages, [Retrieved from Internet on Feb. 12, 2016], <http://citeseerx.ist.psu.edu/viewdoc/download?doi=10.1.1.185.45&rep=rep1&type=pdf>.*

Glenn Brunette et al., "Restricting Service Administration in the Solaris™ 10 Operating System", [Online], Jun. 2005, 21 pages, [Retrieved from Internet on Feb. 12, 2016], <https://www.powersat.org/Documents/Solaris/819-2887.pdf>.*

* cited by examiner

US 9,367,547 B2

METHOD AND SYSTEM FOR GENERATING AND DEPLOYING CONTAINER TEMPLATES

BACKGROUND

It is common for users to request that software and/or the operating environments in which they use the software be customized for their use. The process of customizing is typically a time consuming and manual process.

SUMMARY

In general, in one aspect, the invention relates to a method for creating a deployable zone template of a source zone. The method includes receiving, from the user an instruction to create the deployable zone template of a source zone including a zonepath dataset (ZPDS) and an application image (AI), where the ZPDS is a hierarchy of file systems in which an operating system image of the source zone is installed, creating a zonepath image file of the ZPDS, creating an application image file of the AI, collecting auxiliary zone data describing a dependency of the source zone and configuration a parameter of the source zone, creating an archive file including the zonepath image file, the application image file, and the auxiliary zone data, and combining the archive file and an executable wrapper script to obtain the deployable zone template.

In general, in one aspect, the invention relates to a non-transitory computer readable medium, storing instructions, which when executed by a processor perform a method. The method includes receiving, from the user an instruction to create the deployable zone template of a source zone including a zonepath dataset (ZPDS) and an application image (AI), where the ZPDS is a hierarchy of file systems in which an operating system image of the source zone is installed, creating a zonepath image file of the ZPDS, creating an application image file of the AI, collecting auxiliary zone data describing a dependency of the source zone and a configuration parameter of the source zone, creating an archive file including the zonepath image file, the application image file, and the auxiliary zone data, and combining the archive file and an executable wrapper script to obtain the deployable zone template.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to generating a deployable zone template that includes an authoring tool for creating customized deployable zone templates. Embodiments of the invention further include a method for creating a deployable zone template of a source zone. More specifically, embodiments of the invention relate to creating a deployable zone template by creating a snapshot of a zonepath dataset (ZPDS) of the source zone, and obtaining an application image (AI) of all files (data, configuration, executable) of an application installed within a distinct application file system (AFS) of the source zone, collecting auxiliary zone data specifying the requirements and dependencies of the source zone, and creating an archive file which includes all of the aforementioned components along with an authoring tool. After the archive file has been created it is combined with a wrapper script to facilitate deployment of a customized version of the zone.

Figure 1:
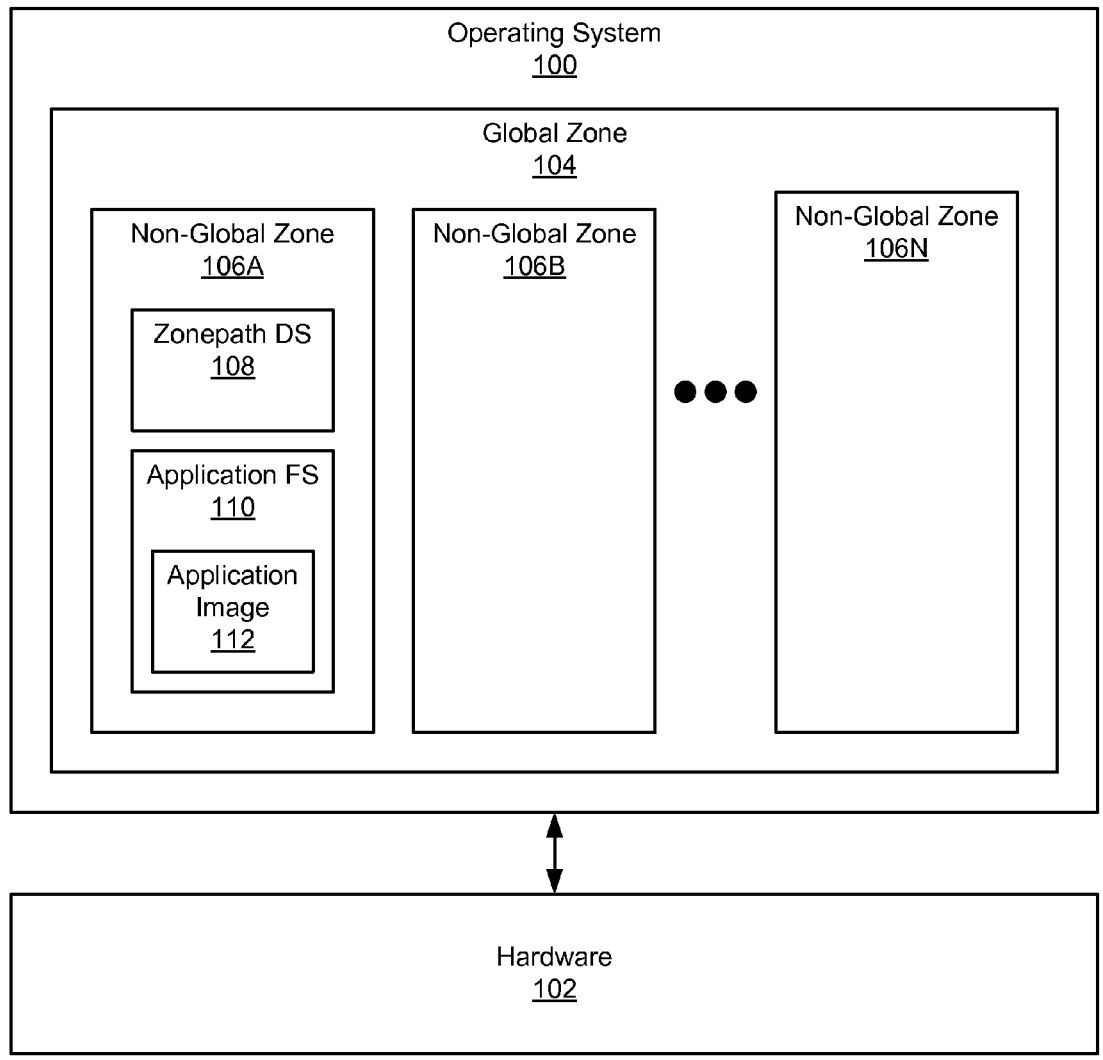
FIG. 1 shows a schematic diagram of a system in accordance with one embodiment of the invention.

FIG. 1 shows a system (100) in accordance with one embodiment of the invention. The system (100) includes an operating system (100) executing on hardware (102). The operating system (100) may be any operating system that includes functionality to support the virtualization scheme as described below and to implement one or more embodiments of the invention. The hardware (102) corresponds to one or more processors, memory, persistent or volatile storage, input/output interfaces, and/or any other hardware components necessary to implement one embodiment of the invention.

In one embodiment of the invention, the operating system (100) includes functionality to support virtualization of the resources of the operating system (100) and the hardware (102). The aforementioned virtualization is implemented using a global zone (104) and one or more non-global zones (106A, 106B, 106N). A zone (e.g., global zone (104), non-global zone (106A, 106B, 106N)) is a virtual environment that shares a kernel with other zones executing on the hardware. Alternately, a zone may present an appearance of a single kernel, with the common kernel partitioned, or only lower-level resources being shared with other zones. In one embodiment of the invention, a distinct kernel may be executed in a virtual machine located in the non-global zone. The functionality of the different types of zones is described below.

As discussed above, the global zone (104) and the non-global zones (106A, 106B, 106N) all execute on the same operating system image. In other words the global zone (104)

and the non-global zones share the same operating system (100) instance. However, each of the zones (global and non-global) is an isolated execution environment. More specifically, processes executing in one of the non-global zone (106A) only has access to the hardware resources that are made available to that non-global zone (106A). A process executing within the scope of a given non-global zone (106A) cannot access processes or information in the scope of other non-global zones (106B, 106N). Unlike the non-global zones (106A, 106B, 106N), the global zone (104) may be able to access and interact with processes and resources within all the non-global zones (106A, 106B, 106N). If a non-global zone is running a distinct kernel, the global zone (The individual scope of each of the non-global zones (106A, 106B, 106N) may be considered a subset of the scope of the global zone (104), which may include the entirety of the actual operating system (100) resources.

In one embodiment of the invention, each of the non-global zones (106A, 106B, 106N) includes a zonepath dataset (ZPDS) (108). The ZPDS (108) is a hierarchy of file systems, volumes, and snapshots, in which the operating system is installed; application files and other files may also be located within the ZPDS (108). A root file system of the ZPDS (108) hierarchy may be mounted in the scope of the global zone (104), but all or some of the sub-file-systems may be located in the shared scope of the global zone (104) and the non-global zone (106A). The individual non-global zones (106A, 106B, 106N), may have a distinct portion of the ZPDS (108) located within their respective scopes, while the portion of the root file system of the ZPDS (108) located in the scope of the global zone (104) may be shared among them. In one embodiment of the invention, the ZPDS (108) may include ZFS file systems, ZFS volumes, and ZFS snapshots.

In one embodiment of the invention, the non-global zone (106A) includes an application file system (AFS) (110). An AFS (110) is a file system that includes an application image (112) (AI) of one or more applications. An AI (112) includes the executables, data files, and configuration files of applications currently installed in the in the AFS (110). In one embodiment of the invention, the AI (112) may include the data describing the AFS (110). The non-global zone (106A) may include multiple distinct application file systems (110). A different set of applications may be installed in a single AFS (110). A single application may be installed across the multiple application file systems (110); the multiple file systems might be located in multiple non-global zones (106A, 106B, 106N). In one embodiment of the invention, the AFS (110) may be located on a networked starge. In one embodiment of the invention, the AFS (110) may be located in a ZFS file system. In one embodiment of the invention, the AFS (110) may be located in a branch of the ZPDS (110). Though not shown in FIG. 2 each non-global zone may include one or more AFSs (110).

Figure 2:
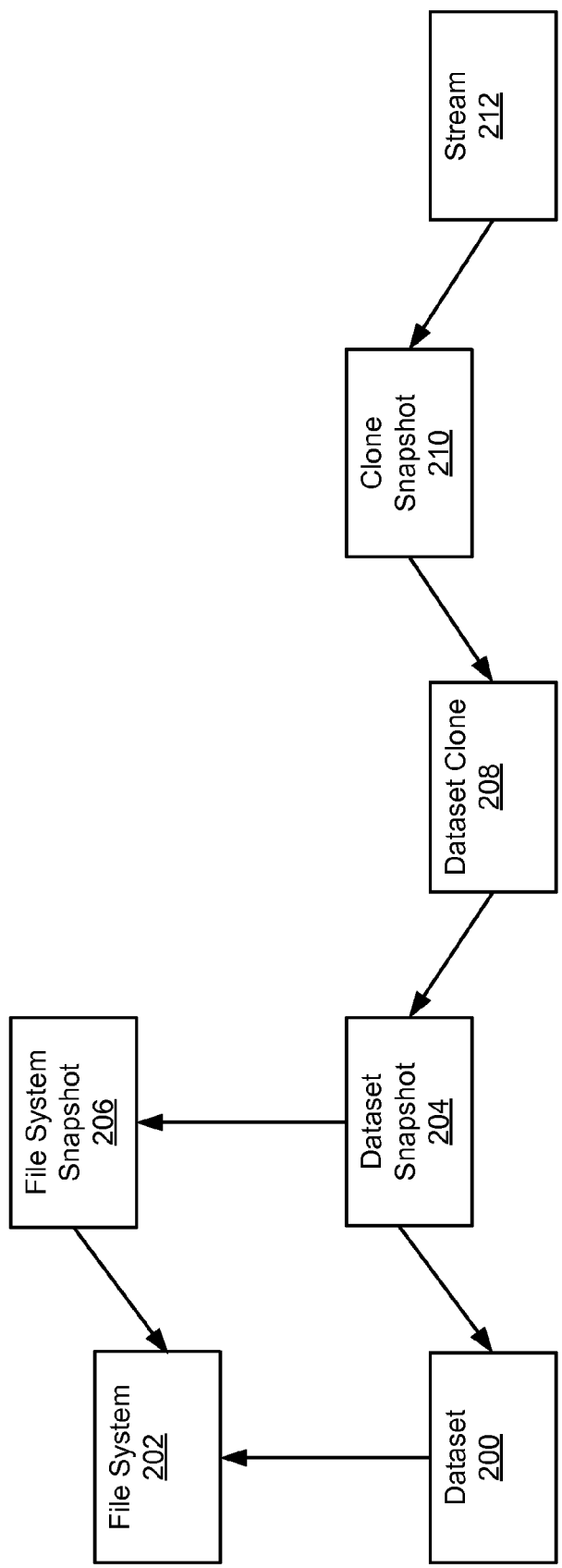
FIG. 2 shows a method for creating a file system image in accordance with one embodiment of the invention.

FIG. 2 shows the components required to make a stream (212) of a snapshot (210) of a sanitized clone (208) of a dataset (200) of the source zone in accordance with one embodiment of the invention.

In one embodiment of the invention, a dataset (200) is a hierarchy of file systems, volumes, and snapshots which are nested inside of a single root file system (202). The dataset (200) may be the ZPDS described in FIG. 1. A ZPDS of a zone is the dataset (200) in which the operating system, as well as other data, such as applications, configurations, and storage of the zone is located. The top level of a ZPDS may be located in a root file system mounted in a global zone of non-global zone. The contents of dataset, however, may be located within the scope of the non-global zone.

In one embodiment of the invention, the file system (202) of the dataset (200) is any data structure or architecture used to organize data into directories. The file system (202) may include files organized into directories and sub-directories. The file system (202) may itself be a sub-directory of a larger file system. The file system (202) may be one of many different file systems located within the dataset (200). The different file systems (202) may be of different types, have different permissions, be used for different purposes, and vary otherwise. In one embodiment of the invention, the different file systems (202) may be used to store different portions of the operating system, configurations, applications, and other data of the zone. Depending on its the purpose and location within the ZPDS hierarchy, the file system (202) may be located partially in the scope of a non-global zone and partially in the scope of a global zone. In one embodiment of the invention, the file system (202), and associated functionality to create the snapshots (202, 204), clone (204) and stream (208) are defined by the ZFS specification. In one embodiment of the invention, a file system is deemed to be sanitized when all confidential information is removed from the file system.

In one embodiment of the invention, a snapshot (204) of the dataset (200) corresponds to a state of the dataset (200) at the time at which the dataset snapshot (204) was made. The dataset snapshot (204) is typically set with read-only permission to prevent its modification. Further, in place of a references to a file system (202) within the hierarchy of the dataset (200), the snapshot (204) of the dataset (200) includes a snapshot (206) of the file system (202). In one embodiment of the invention, the dataset snapshot (204) may only capture a portion of the dataset (200) that is located within the scope of the non-global zone.

In one embodiment of the invention, a dataset clone (208) initially corresponds to the state of the file system at a given time; however, unlike the snapshot, the file system clone may be subsequently modified. In one embodiment of the invention, a dataset snapshot (202) may be used to create the dataset clone (208) of the dataset (200). The dataset clone (208) may be modified at will by the user, and is completely distinct from the original dataset (200). The user may remove any unwanted files, applications, and information from the dataset clone (208), without affecting the original dataset (208).

In one embodiment of the invention, a clone snapshot (210) is a snapshot created of the dataset clone (208). The clone snapshot (210) functions by the same mechanism as the dataset snapshot (202) but is a snapshot of the dataset clone (208) rather than the original dataset (200).

In one embodiment of the invention, a stream (212) of the clone snapshot (210) is created, where the stream (212) is a set of bits corresponding to the clone snapshot (210) and may include all the necessary information to generate a new dataset, identical to the dataset clone (208) referenced by the clone snapshot (210). The bits in the stream (212) are arranged such that they may be used to create a clone of the dataset clone (208) at the location to which the stream (212) is sent or written. In one embodiment of the invention, the stream (212) may need to be received, or deployed by a specific tool or command in the new location. The stream (212) may be captured in or output to an archive file. When extracted from the archive file, the clone stream (212) may automatically recreated the file system in the environment into which it is extracted. If the stream (212) is of a zonepath dataset, and is extracted into an appropriate configured global zone, a new zone may be created.

Figure 3:
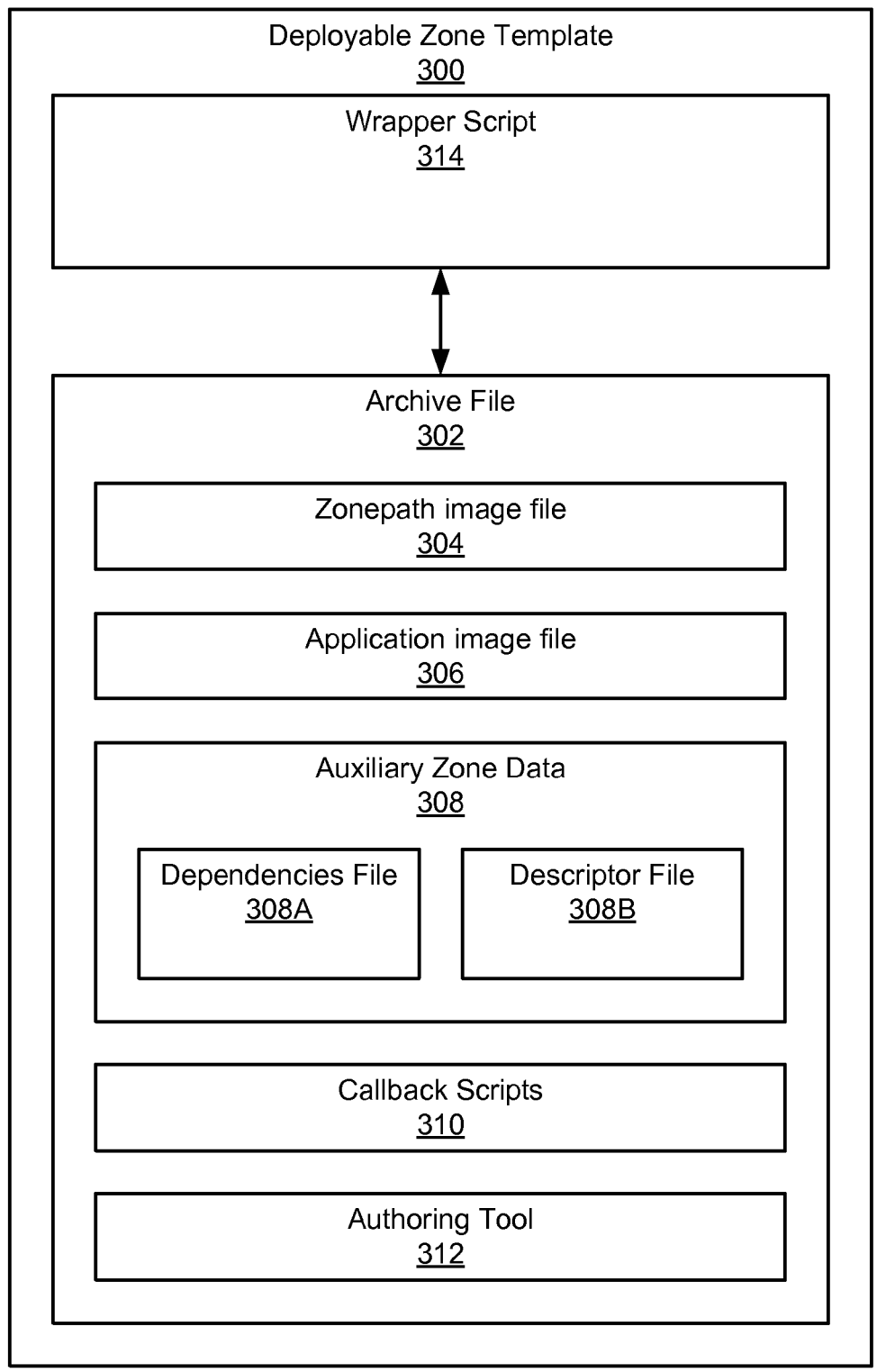
FIG. 3 shows a deployable zone template in accordance with one embodiment of the invention.

FIG. 3 shows a deployable zone template (300) in accordance with one embodiment of the invention. The deployable zone template (300) may include an archive file (302) which stores the data required to create a zone and a wrapper script (312) which allows the user to manipulate and use the deployable zone template (300) and its contents without requiring an external program.

In one embodiment of the invention, the archive file (302) may be a file format which stores multiple files. The files may be stored in a compressed or uncompressed format. In one embodiment of the invention, the archive file (302) may be encrypted or protected. The archive file (302) may include functionality for the files included within it to be accessed, manipulated, and extracted individually. In one embodiment of the invention, the zone can be deployed directly from the archive file by the extraction process, and does not require staging, or allocation of temporary space. In one embodiment of the invention, the files in the archive may include a stream of a ZPDS (304) of a zone (also referred to as a zonepath image file (304)), an application image, or a file system including an application image, of a zone (also referred to as a application image file (306), auxiliary zone data (308) that specifies the dependencies and parameters of a zone stored in a dependencies file (308A) and a descriptor file (308B) respectively, callbacks scripts (310) which include instructions for deploying the zone and the application, and an authoring tool (312). The "zone" referenced in the deployable zone template corresponds to the zone that will be deployed using the template (see e.g., FIG. 5).

In one embodiment of the invention, the zonepath image file (304) may be an archived version of the entire ZPDS. Alternately, the zonepath image file (304) may be a captured stream of a snapshot of the ZPDS. The zonepath image file (304) may include a sanitized version of the ZPDS of the source zone, which has been purged of sensitive data (or otherwise confidential data) prior to being added to the deployable zone template (300). The zonepath image file (304) may be created from and deployed as a non-global zone. Alternately, the zonepath image file (304) may be created from a global zone that has been converted to a non-global zone. In one embodiment of the invention, a zone may be created by extracting or writing the contents of the zonepath image file (304). Alternately, the content of the zonepath image file (304) may need to be extracted or written into an existing zone. The zonepath image file (304) may be deployed as a new non-global zone in the scope of an existing global zone; the global zone onto which the new non-global zone is deployed may require modification to support the global zone. Alternately, the zonepath image file (304) may be deployed into new execution environment, and create a global zone in addition to, or in place of, a non-global zone. In one embodiment of the invention, the zonepath image file (304) may be deployed as non-zone virtual environment, regardless of whether source.

In one embodiment of the invention, the application image file (306) may be a direct copy of the bits of an AI of applications installed within the source zone. The application image file (306) may include the file system infrastructure of the AFS in which the AI resides or it may only include the bits of the AI. In some embodiments, the image may include only bits of a specific AI or a specific part of an AI installed within a specific AFS. The image may only include a portion of the entire AI deployed within the source zone (i.e., the zone on which the deployable zone template is based). The application image file (306) may be arranged such that the AI may be deployed in any type of file system in the zone to being created, independent of the file system type of the AFS in the source zone. Alternately, the AFS that includes the AI may be extracted and deployed verbatim into zone being deployed.

The application image file (306) may be one of many possible types of archive, including cpio, tar, zip, pax, and others. The type of archive file may allow the application bits to be deployed into many different types of file system, such as ZFS, NFS, NTFS, UFS, VxFS, ext3, Btrfs, and others. In one embodiment of the invention, the contents of the application image file (306) may only be extracted into a specifically configured zone. Alternately, the contents of the application image file (306) may need to be extracted or written directly into an existing file system.

In one embodiment of the invention, the auxiliary zone data (308) specifies requirements and dependencies of the zone. The auxiliary zone data (308) may include multiple files and/or file types. The dependencies specified in the auxiliary zone data (308) may include a list of packages, software, and drivers, as well as version and compatibility information, that must be present in a global zone in order for the zone, once deployed, to properly function. The dependencies may be stored in a distinct dependencies file (308A).

The auxiliary zone data (308) may also include information describing parameters and requirements of the zone being deployed. Requirements may include, for example, the amount of free space the zone requires in order to be deployed, or system resource allocations required by the application or zone. The parameters may describe required attributes of the operating system and applications that are needed in order to deploy the zone. Attributes may be obtained from the source zone and included in the template. Alternately, the may be obtained from the user or the system in which the template is being deployed. Attributes may include, for example, account usernames and passwords or IP addresses. For each attribute in the descriptor a name and a value are specified. A value may be a literal value or a keyword. For example, the keyword 'user' specifies that the user deploying the template should be prompted for the final value. The keyword 'parent' specifies that the final value should be duplicated from the global zone. The keyword 'random' specifies that the final value should be randomly generated on the fly by the template itself. Requirements and parameters may be stored in a distinct descriptor file (308B).

In one embodiment of the invention, callback scripts (310) execute tasks specified by the template author at different steps during zone deployment. Callback scripts (310) may be inherited from previous templates, may be previous templates that have been edited by the user, or may be created from scratch by the user. In one embodiment, the authoring tool (312) may provide a framework for users to create callback scripts. Callback scripts (310) may be executed automatically at any defined point during zone deployment. Callback scripts (310) may execute automatically after the ZPDS and the AI are available in the global zone but before the non-global zone starts its boot process; after the non-global zone has completed its boot process; at any point in which the non-global zone's operating system state is defined, such as, for example, when the non-global zone is being designated as single-user or networked. A callback script (310) executed before the non-global zone starts its boot process are executed in the scope of the global zone. Callback scripts (310) executed after the boot process is started may be executed in the scope of the global zone or in the scope of the non-global zone.

In one embodiment of the invention, the authoring tool (312) may be a script that when executed creates the zonepath image file (304) and the application image file (306), initiates the collection of auxiliary zone data. The authoring tool (312) may be a copy of the authoring tool (312) used to create the deployable zone template (300). The authoring tool (312)

may include functionality to directly create zones in addition to deployable zone templates (300).

In one embodiment of the invention, the deployable zone template (300) includes a wrapper script (314) to which the archive file (302) is concatenated. The wrapper script (314) may be a shell script including functionality to unpack and deploy the zone stored in the archive file. The wrapper script (314) may also provide the user with an interface by which to execute the authoring tool (312) in order to create a new deployable zone template (300). The wrapper script (314) may also be used to directly manipulate, retrieve, extract and modify the contents of the archive file (302). In one embodiment of the invention, the wrapper script (314) includes functionality to individually access and manipulate the contents of the archive file (302). The wrapper script (314) may include functionality to deploy the zone directly from the archive file (302).

Figure 4:
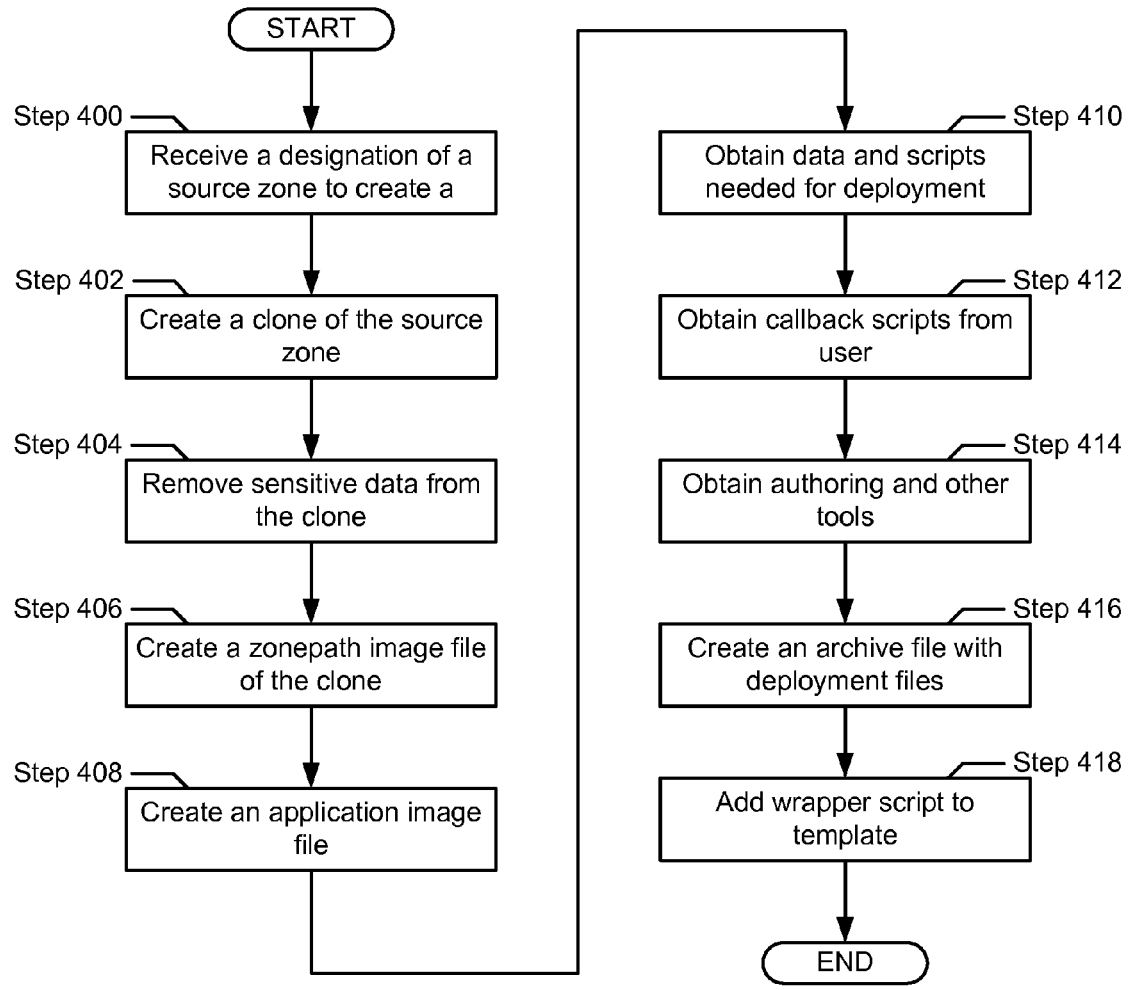
FIG. 4 shows a flowchart for creating a deployable zone template in accordance with one embodiment of the invention.

FIG. 4. shows a flowchart for creating a deployable zone template from a source zone in accordance with one embodiment of the invention. While the various steps in the flowchart are presented and described sequentially, one of ordinary skill will appreciate that some or all of the steps may be executed in different orders, may be combined or omitted, and some or all of the steps may be executed in parallel.

In Step 400, a zone is designated as a source zone for the creation of a deployable zone template. In one embodiment of the invention, the authoring tool may be located in a global zone, in which case the user may designate a source zone using a flag in the instruction to create a new zone template. Alternately, the authoring tool may be located within the scope of the source zone, and may automatically create a zone template based off of the current state of the source zone. In one embodiment of the invention, in addition to a designation of a source zone, the user may also designate specific parts of the source zone to use. For example, the user may specify that specific file systems and applications are to be included or excluded from the deployable zone template being created. The user might also specify a level of compatibility that the deployable zone template must have with regards to global zone in which a zone created using the template may be deployed; this may in turn cause the authoring tool to include or exclude portions of the source zone that it otherwise would not in order to assure that the deployable zone template is only deployed in the correct conditions, or to ensure that it is easily deployable independent of the system in which it is being deployed.

In Step 402, a clone of the source zone is created. More specifically, a snapshot of the ZPDS for the source zone is created. A clone of the snapshot is then created from the snapshot. In one embodiment of the invention, the initial snapshot may be taken of the entire ZPDS, including the portions located in the global zone and the source zone. Alternately, only the portion of the ZPDS located in the source zone is included in the initial snapshot. In one embodiment of the invention, the global zone is used as the source zone. In this case, the global zone may be converted into a non-global zone prior to the snapshot being taken. The snapshot may be taken, or the clone may be created in such a way as to isolate the ZPDS from its original execution environment.

In Step 404, sensitive data is removed from the clone to sanitize the ZPDS. In one embodiment of the invention, the user may be prompted to designate the sensitive files and directories to remove from the ZPDS of the clone. In one embodiment of the invention, only a portion of the source zone is cloned, and the portion is modified, then added to the snapshot in place of the original portion. Alternately, the user may sanitize the source zone manually prior beginning the process of creating a template. In one embodiment of the invention, specific data and locations of the ZPDS may automatically have the data removed, or may be omitted from the zonepath image file.

In Step 406, after the sanitization has been completed a snapshot of the clone is created and then used to create a stream of the sanitized ZPDS (also referred to as the zonepath image file). The stream may be written to one or more files to be included in the deployable zone template.

In Step 408, an application image file is created of the AFS of the source zone. In one embodiment of the invention, to create an application image file, the entire AFS is archived into a file(s). Alternately, only the bits pertaining to specific applications may be archived. In one embodiment of the invention, specific applications or portions of the AFS may be included or omitted. Multiple AFSs may be added to a single application image file, or multiple application image files of one or more AFS may be created. The application image file may be obtained from one or more AFSs located in different zones. The AFS may be sanitized prior to the creation of the application image file in the same manner as described above with respect to the zonepath FS. Alternately, the user may provide a list of files or directories that should be removed from the AI to be used in the deployable zone template. In one embodiment of the invention, the application image file may be a cpio image file, where the contents of the cpio image may be compressed prior to being included in the deployable zone template. Alternately, other types of archive or image types may be used to create the image. In one embodiment of the invention, the application image file is created in such a way as to make it deployable in types of file system other than that of the AFS.

In Step 410, auxiliary zone data is collected from the global zone, the source zone and other relevant sources. The auxiliary zone data may include, but is not limited to, dependencies, requirements, and parameters describing attributes of the non-global zone.

The different varieties of auxiliary zone data may be collected in different ways, and collected into different multiple different files. Collecting dependency data may include, for example, determining what software packages and versions must be present in the global zone in order for the source zone to function properly. Collecting data on other requirements may include determining the amount of space occupied by the source zone, by the ZPDS, or by the AI, by determining the individual resource usage of each of those, and the obtaining of any other metadata relevant to the instillation and use of the contents of the zone. Dependency data may be placed into a distinct 'dependencies' file.

Alternately, parameter data may include attributes, which may be obtained from the source zone, from the user, or from the system in which the template is being deployed. The attributes may specify information required by the zone and application to deploy, and include instructions for how to collect said information. The parameters may include information as well. The parameters may be placed into a distinct 'descriptor' file.

In Step 412, callback scripts that have been selected, modified, and created, by the user are obtained. The callback scripts may be obtained from existing zone templates. The existing callback scripts may be modified by the user before being added to the zone template. Alternately, the callback scripts obtained may be custom made by the user, who specifies that they be added. In one embodiment of the invention, the authoring tool may include functionality to allow the user to edit callback scripts.

In Step 414, an authoring and similar tools used in the creation of a zone template are obtained. The other tools may include scripts, which may be used to create or augment a zone template. In one embodiment of the invention, the scripts may be selected based upon the types of applications, files, and file systems being deployed, and execution environments in which the deployment is being done. Alternately, the authoring tools are the same in every template. In one embodiment of the invention, the tools may be acquired from an existing zone template. For example, if a user uses the authoring tool in an existing zone template to create a new zone template, the authoring tool may include a copy of itself in the new zone template.

In Step 416, the zonepath image file, the application image file, the auxiliary zone data, and the authoring tool are packaged together into an archive file. Different types of archive file may be selected based on the contents and the environment in which the archive file is being used without departing from the invention. In one embodiment of the invention, the archive file may be compressed. The archive file may also be encrypted, or otherwise protected. In one embodiment of the invention, multiple archive files may be used, in parallel, in serial, or in a hierarchy.

In Step 418, the archive file is combined with a wrapper script to create the deployable zone template. The wrapper script may be specifically tailored to the contents of the archive file or the environment in which it is intended to be deployed. For example, the wrapper script may have options added or removed based on the capabilities or requirements of the contents of the archive file, and the ease with which they are accessed.

Figure 5:
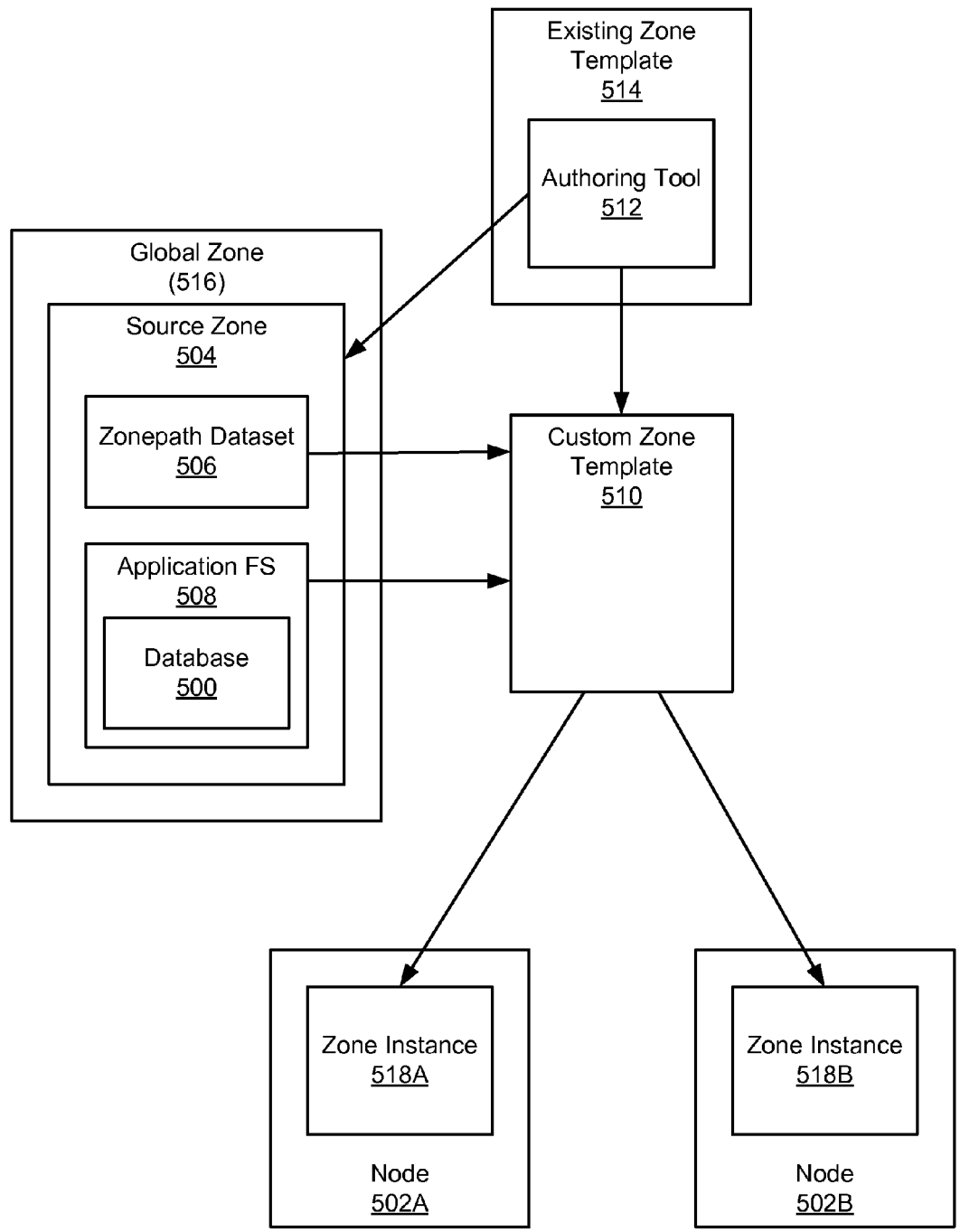
FIG. 5 shows an example of a deployable zone template being created and deployed in accordance with one embodiment of the invention.

FIG. 5 shows an example for creating a deployable zone template in accordance with one embodiment of the invention. The example is not intended to limit the invention.

Consider the scenario in which a user wishes to install a database (500) with a customized configuration across a number of different nodes (502A, 502B) in a distributed computer network. The operating system is the same on each of the nodes (502A, 502B) and supports a zone-type virtualization scheme. Because the user desires a single database (500) distributed across the nodes, each of the portions of the database (500) will require an identically configured execution environment and instance of the software of the database (500). Rather than manually creating and setting up a new non-global zone, and installing and configuring a separate instance of the database (500) software on each node (502A, 502B), the user may wish to create and provision a single source zone (504), and then deploy an identical instance of this source zone (504) on each node (502A, 502B). Based on the above requirements, the user creates a zone template of a zone with the properly configured database software already installed.

Initially, the user creates a non-global zone (504) to use as the source zone. The source zone (504) includes two distinct ZFS file systems (506, 508): (i) a ZPDS (506) in which the operating system image of the source zone (504) is installed, and (ii) an AFS (508), in which the database (500) software and any other required software is installed. The user ensures that the source zone (504) is running, which is required to create a deployable zone template (510) of a zone.

The user accesses the authoring tool (512) embedded in an existing zone template (514) using command line instructions. The existing zone template (514) may be wrapped in a script, and the user accesses the authoring tool (512) by executing the script with appropriate flags. The user specifies the source zone (504) to be used to create the deployable zone template (510). The authoring tool (512) first creates a snapshot of the ZPDS (506) of the source zone (504). The ZPDS (506) is the file system in which the operating system image of the source zone (504) is installed. Once a snapshot of the ZPDS (506) has been created, the authoring tool (514) creates a local clone of the ZPDS using the snapshot. The user is then prompted to sanitize the ZPDS of the local clone. The user removes any sensitive information from the clone. Alternately, sensitive information is automatically removed by the authoring tool (512). The authoring tool (512) then creates a snapshot of the sanitized clone, and turns the clone snapshot into a stream, which is output into a zonepath image file.

After the zonepath image file has been created, the authoring tool (512) creates a cpio image of the AFS (508). Next, the authoring tool (512) collects data about the dependencies and requirements of the source zone (504), such as specific packages that must be installed in the global zone (516) and the space required to deploy the zone. Finally, authoring tool (512) collects template tools including the authoring tool (512) and other scripts included in the existing zone template (514), which must be added to the deployable zone template (510). When all of the required data structures describing the source zone (504) have been created and collected, the authoring tool (512) combines them into a single zip file. Finally, the zip file is concatenated with a wrapper script, which allows the deployable zone template (510) to be easily accessed and deployed in. The user may then deploy the deployable zone template (512) within any similar operating system environment by executing the wrapper script to determine requirements of the global zone of the target node, upgrade the zonepath of the created zone to the appropriate level, and extract the contents of zip file directly into a functional zone identical to the sanitized source zone. In this case, the user customized database (500) are automatically deployed via identical zone instances (518A, 518B) on the different nodes (502A, 502B).

Figure 6:
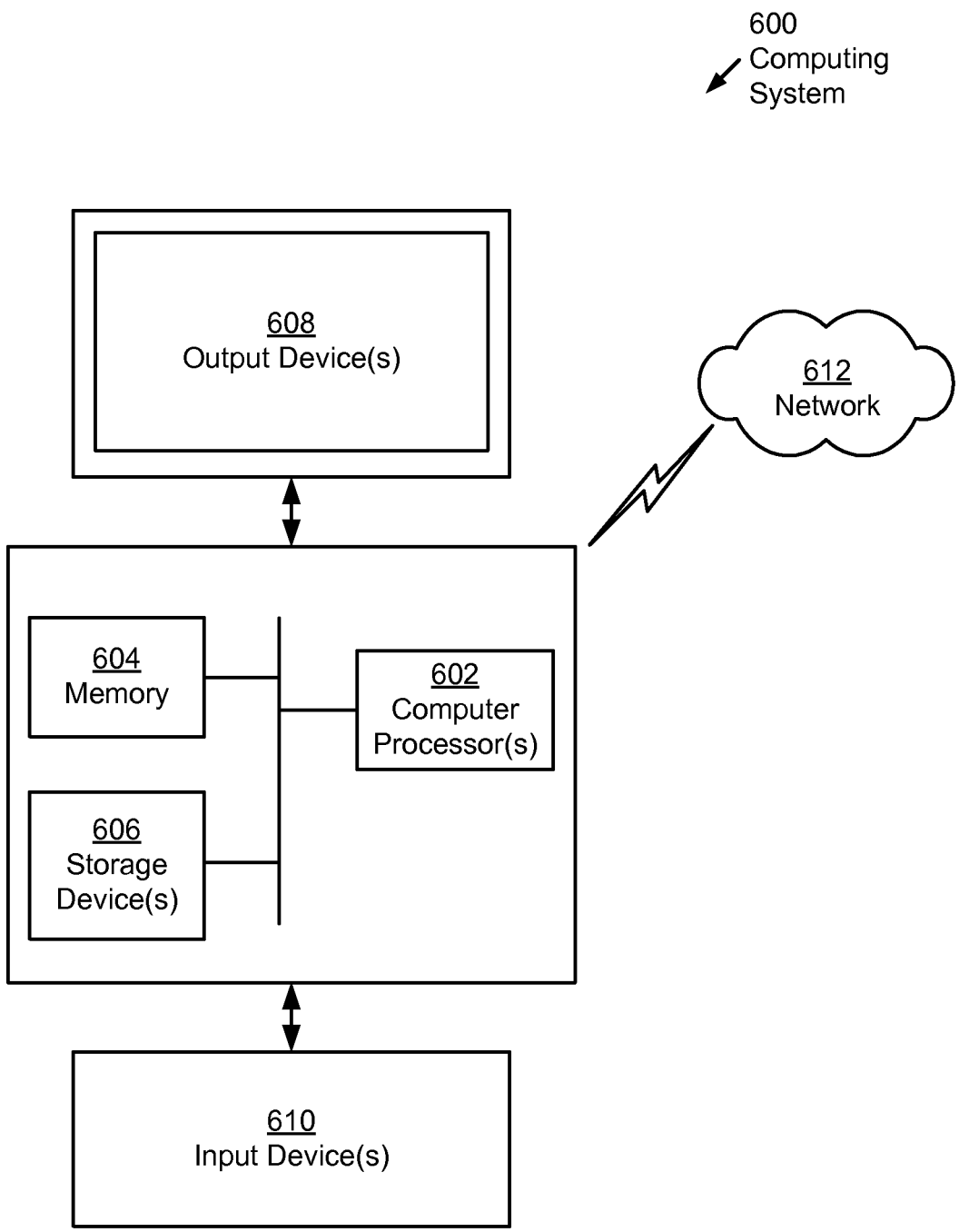
FIG. 6 shows a computer system in accordance with one or more embodiments of the invention.

Embodiments of the invention may be implemented on virtually any type of computing system regardless of the platform being used. For example, the computing system may include desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s)(606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (614) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (614). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for creating a deployable zone template of a source zone, comprising:
   receiving, from a user, an instruction to create the deployable zone template of the source zone comprising a zonepath dataset (ZPDS) and an application image (AI),
      wherein the ZPDS is a hierarchy of file systems in which an operating system image of the source zone is installed, and
      wherein the AI comprises a plurality of files of an application installed in the source zone;
   obtaining, from an existing zone template, an authoring tool;
   creating, using the authoring tool, a zonepath image file of the ZPDS;
   creating, using the authoring tool, an application image file of the AI;
   collecting, using the authoring tool, auxiliary zone data describing a dependency of the source zone and a configuration parameter of the source zone;
   creating, using the authoring tool, an archive file comprising the zonepath image file, the application image file, the auxiliary zone data, and the authoring tool;
   combining the archive file and an executable wrapper script to generate the deployable zone template;
   executing the application on a network computer node by at least deploying the deployable zone template to create a zone instance on the network computer node, and
   obtaining a callback script, wherein the callback script comprises a plurality of instructions for deploying a zone and an application using the deployable zone template, wherein the archive file comprises the callback script.

2. The method of claim 1, wherein creating the zonepath image file further comprises:
   creating a first snapshot of the ZPDS of the source zone;
   creating, using the first snapshot, a clone of the source zone;
   modifying the clone of the source zone;
   creating a second snapshot of the ZPDS of the clone; and
   creating, by creating a stream of the second snapshot, the zonepath image file.

3. The method of claim 2, wherein the modifying removes sensitive data from the clone of the source zone.

4. The method of claim 1, wherein the source zone is a non-global zone located within a global zone, and wherein the ZPDS is located in both the non-global zone and the global zone, wherein the application is a user customized distributed database.

5. The method of claim 1, wherein contents of the archive file are individually accessible.

6. The method of claim 1,
   wherein the dependency of the source zone comprises a requirement of a software package in a global zone of a zone being deployed from the deployable zone template, and
   wherein the configuration parameter comprises a keyword and a required data item of the zone, wherein the keyword is used to obtain the required data item when the zone is deployed.

7. A non-transitory computer readable medium, comprising instructions, which when executed by a process perform a method, the method comprising:
   receiving, from a user, an instruction to create a deployable zone template of a source zone comprising a zonepath dataset (ZPDS) and an application image (AI),
      wherein the ZPDS is a hierarchy of file systems in which an operating system image of the source zone is installed, and
      wherein the AI comprises a plurality of files of an application installed in the source zone;
   obtaining, from an existing zone template, an authoring tool;
   creating, using the authoring tool, a zonepath image file of the ZPDS;
   creating, using the authoring tool, an application image file of the AI;
   collecting, using the authoring tool, auxiliary zone data describing a dependency of the source zone and a configuration parameter of the source zone;
   creating, using the authoring tool, an archive file comprising the zonepath image file, the application image file, the auxiliary zone data, and the authoring tool;
   combining the archive file and an executable wrapper script to generate the deployable zone template;
   executing the application on a network computer node by at least deploying the deployable zone template to create a zone instance on the network computer node, and
   obtaining a callback script, wherein the callback script comprises a plurality of instructions for deploying a zone and an application using the deployable zone template, wherein the archive file comprises the callback script.

8. The non-transitory computer readable medium of claim 7, wherein creating the ZPDS image further comprises:
   creating a first snapshot of the ZPDS of the source zone;
   creating, using the first snapshot, a clone of the source zone;
   modifying the clone of the source zone;
   creating a second snapshot of the ZPDS of the clone; and
   creating, by creating a stream of the second snapshot, the ZPDS image.

9. The non-transitory computer readable medium of claim 8, wherein the modification removes sensitive data from the clone of the source zone.

10. The non-transitory computer readable medium of claim 7, wherein the source zone is a non-global zone located within a global zone, and wherein the ZPDS is located in both the non-global zone and the global zone.

11. The non-transitory computer readable medium of claim 7, wherein contents of the archive file are individually accessible.

12. The non-transitory computer readable medium of claim 7,
   wherein the dependency of the source zone comprises a requirement of a software package in a global zone of a zone being deployed from the deployable zone template, and
   wherein the configuration parameter comprises a keyword and a required data item of the zone, wherein the keyword is used to obtain the required data item when the zone is deployed.

* * * * *